(12) United States Patent  
Knickerbocker

(10) Patent No.: US 6,397,805 B1  
(45) Date of Patent: Jun. 4, 2002

(54) RETAINER FOR ROCKER ARM COUPLING IN AN INTERNAL COMBUSTION ENGINE

(76) Inventor: Michael G. Knickerbocker, 832 Stonebridge La., Crystal Lake, IL (US) 60014

( * ) Notice: Subject to any disclaimer, the term of this patent is extended or adjusted under 35 U.S.C. 154(b) by 0 days.

(21) Appl. No.: 09/804,565

(22) Filed: Mar. 12, 2001

Related U.S. Application Data

(63) Continuation-in-part of application No. 09/340,757, filed on Jun. 28, 1999, now Pat. No. 6,199,526.

(51) Int. Cl.$^7$ .................................................. F01L 1/18
(52) U.S. Cl. ..................................... 123/90.39; 403/135
(58) Field of Search .......................... 123/90.39, 90.46, 123/90.55, 90.67; 403/135, 138

(56) References Cited

U.S. PATENT DOCUMENTS

| | | | | |
|---|---|---|---|---|
| 3,008,687 A | | 11/1961 | Tauschek et al. ......... | 123/90.67 |
| 3,978,830 A | * | 8/1976 | Toth ......................... | 123/90.67 |
| 4,693,628 A | * | 9/1987 | Renk .......................... | 403/135 |
| 4,708,103 A | | 11/1987 | Speil ......................... | 123/90.46 |
| 4,729,350 A | * | 3/1988 | Speil ......................... | 123/90.55 |
| 4,856,468 A | | 8/1989 | Speil et al. ............... | 123/90.47 |
| 4,856,795 A | | 8/1989 | DeLano et al. ............. | 277/212 |
| 5,066,159 A | | 11/1991 | Urbach ........................ | 403/134 |
| 5,067,841 A | | 11/1991 | Fukukawa et al. .......... | 403/140 |
| 5,154,530 A | | 10/1992 | Dresselhouse .............. | 403/138 |
| 5,632,237 A | | 5/1997 | Cornell et al. ........... | 123/90.46 |
| 5,645,023 A | | 7/1997 | Regueiro ................. | 123/90.27 |
| 5,672,023 A | * | 9/1997 | Lieber et al. ............... | 403/138 |
| 5,706,771 A | | 1/1998 | Van Heyningen et al. ........................ | 123/90.46 |
| 5,772,337 A | | 6/1998 | Maughan et al. ........... | 384/206 |
| 5,782,573 A | | 7/1998 | Dorr et al. .................. | 403/135 |
| 6,039,018 A | * | 3/2000 | Spath | |
| 6,042,293 A | | 3/2000 | Maughan ..................... | 403/135 |
| 6,138,624 A | * | 10/2000 | Wolck et al. | |
| 6,148,780 A | * | 11/2000 | ONeill et al. | |
| 6,199,526 B1 | | 3/2001 | Knickerbocker ......... | 123/90.39 |
| 6,209,499 B1 | * | 4/2001 | Owen et al. | |
| 6,273,042 B1 | * | 8/2001 | Perez et al. | |

FOREIGN PATENT DOCUMENTS

| | | | |
|---|---|---|---|
| DE | 3208152 | * | 3/1982 |
| DE | 3541198 | | 5/1987 |
| JP | 58-178813 | | 10/1983 |

* cited by examiner

*Primary Examiner*—Thomas Denion
*Assistant Examiner*—Ching Chang

(57) ABSTRACT

A resilient retainer is disclosed for a rocker arm coupling joining a valve assembly to a rocker arm assembly in an internal combustion engine. The rocker arm coupling comprises a first coupling member having a socket for receiving a ball extending from a second coupling member. The resilient retainer consists of unitary polymeric material comprising a resilient mounting portion and a resilient restricting portion. The resilient mounting portion is engageable with a recess delineated within the first coupling member for resiliently securing the resilient retainer. The resilient restricting portion permits insertion of the ball into the socket upon deformation of the resilient restricting portion with the resilient restricting portion inhibiting removal of the ball from the socket.

20 Claims, 10 Drawing Sheets

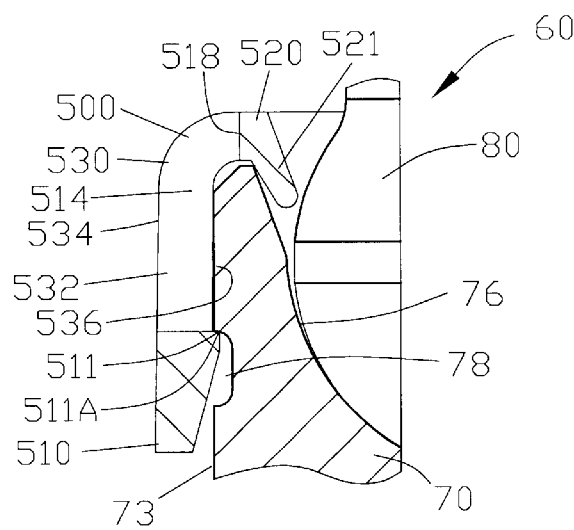 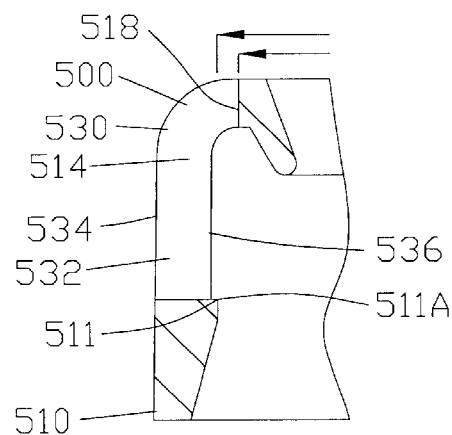
FIG. 17A    FIG. 17B
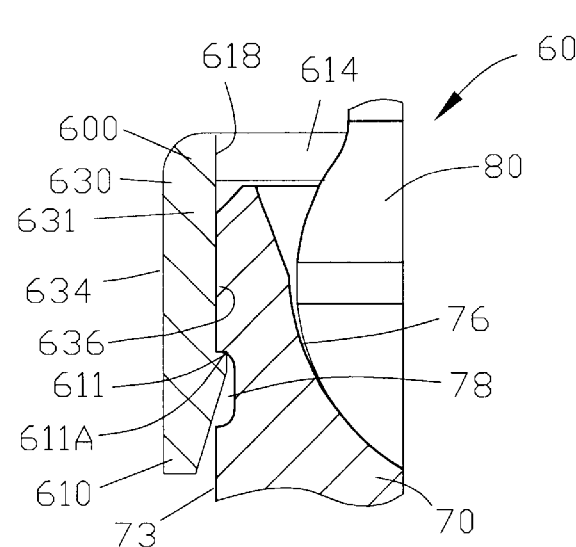 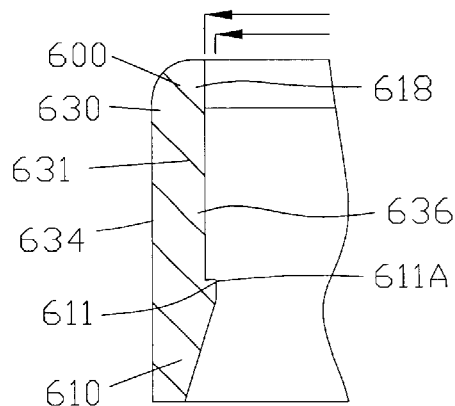
FIG. 20A    FIG. 20B

RETAINER FOR ROCKER ARM COUPLING IN AN INTERNAL COMBUSTION ENGINE

CROSS-REFERENCE TO RELATED APPLICATIONS

This is a continuation-in-part of U.S. patent application Ser. No. 09/340,757 filed Jun. 28, 1999 now U.S. Pat. No. 6,199,526. All subject matter set forth in application Ser. No. 09/340,757 filed Jun. 28, 1999 is hereby incorporated by reference into the present application as if fully set forth herein.

BACKGROUND OF THE INVENTION

1. Field of the Invention

This invention relates to internal combustion engines and more particularly to an improved retainer for a rocker arm coupling in an internal combustion engine.

2. Background of the Invention

In an overhead valve internal combustion engine, the valves of the engine are positioned over the cylinders containing the pistons of the engine. In many cases, the overhead valves are actuated by a rocker arm positioned over the overhead valves. A cam shaft positioned below the plurality of rocker arms actuates the plurality of rocker arms through a plurality of push rods.

A rocker arm coupling is interposed between each of the rockers arms and a valve stem of the plurality of overhead valves. The rocker arm coupling comprises a ball and socket coupling for translating the rocking motion of the rocker arm into reciprocating linear motion of the overhead valve.

Typically, the rocker arm coupling comprises a first and a second coupling member with a socket disposed in the first coupling member for receiving a ball extending from the second coupling member. The first coupling member is engaged with an end of the valve stem whereas the second coupling member is engageable with the rocker arm.

A retainer is interposed between the first and second coupling members for maintaining the ball of the second coupling member within the socket of the first coupling member. Typically, the retainer was a metallic spring clip which was receivable within a recess in the first coupling member and provided an interference fit with the ball extending from the second coupling member.

Although the metallic spring clip functioned properly for maintaining the ball within the socket of the rocker arm coupling, the metallic spring clip was difficult to insert into the recess in the first coupling member. Furthermore, the metallic spring clip complicated the insertion of the ball within the socket of the rocker arm coupling.

In my prior U.S. Pat. No. 6,199,526, I set forth a resilient retainer for a rocker arm coupling joining a valve assembly to a rocker arm assembly in an internal combustion engine. The rocker arm coupling comprises a first coupling member having a socket for receiving a ball extending from a second coupling member. The resilient retainer consists of unitary polymeric material comprising a resilient mounting portion and a resilient restricting portion. The resilient mounting portion is engageable with a recess delineated within the first coupling member for resiliently securing the resilient retainer. The resilient restricting portion permits insertion of the ball into the socket upon deformation of the resilient restricting portion with the resilient restricting portion inhibiting removal of the ball from the socket.

It is an object of this invention to provide an alternative to my prior U.S. Pat. No. 6,199,526 and to provide an improved retainer for a rocker arm coupling of internal combustion engine.

Another object of this invention is to provide an improved retainer for a rocker arm coupling in an internal combustion engine for inhibiting separation of a ball and a socket of the rocker arm coupling that is a substantial advancement in the prior art.

Another object of this invention is to provide an improved retainer for a rocker arm coupling in an internal combustion engine that facilitates the insertion of the ball within the socket of the rocker arm coupling.

Another object of this invention is to provide an improved retainer for a rocker arm coupling in an internal combustion engine that facilitates the insertion of the ball into the socket of the rocker arm coupling without the use of specialized tools required by the prior art.

Another object of this invention is to provide an improved retainer for a rocker arm coupling in an internal combustion engine that is made of a resilient polymeric material.

Another object of this invention is to provide an improved retainer for a rocker arm coupling in an internal combustion engine that is suitable for use with conventional rocker arm couplings of the prior art.

Another object of this invention is to provide an improved retainer for a rocker arm coupling in an internal combustion engine that is economical to manufacture and install.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improvement for an internal combustion engine having a valve assembly and a rocker arm assembly with a rocker arm coupling interposed therebetween. The rocker arm coupling comprises a first coupling member engageable relative to the valve assembly and a second coupling member engageable relative to the rocker arm assembly. The improvement comprises a retainer formed from a polymeric material for inhibiting separation of the first coupling member relative to the second coupling member.

In a more specific embodiment of the invention, the first coupling member has a socket for receiving a ball extending from the second coupling member and with an annular recess delineated within the first coupling member. The resilient retainer comprises a resilient mounting portion and a resilient restricting portion. The resilient mounting portion of the resilient retainer comprises a plurality of projections being engageable with the recess delineated within the first coupling member for resiliently securing the resilient retainer to the first coupling member. A plurality of voids are defined in the resilient mounting portion and located adjacent to said plurality of projections, respectively. The resilient restricting portion permits insertion of the ball into the socket defined in the first coupling member upon deformation of the resilient restricting portion. The resilient restricting portion inhibits removal of the ball from the socket. Preferably, the resilient retainer is a unitary polymeric material such as a unitary high temperature plastic material.

In one embodiment of the invention, the resilient mounting portion may comprise a projection extending from the resilient retainer. The projection is receivable within the recess delineated within the first coupling member upon deformation of the resilient retainer for resiliently securing the resilient retainer to the first coupling member.

In another embodiment of the invention, the resilient restricting portion comprises a resilient protuberance extending toward the socket. The resilient protuberance is tapered for permitting insertion of the ball into the socket upon deformation of the resilient protuberance and for inhibiting removal of the ball from the socket.

In still another embodiment of the invention, the resilient restricting portion comprises a resilient protuberance extending in an angular direction toward the socket for permitting insertion of the ball into the socket upon deformation of the resilient protuberance and for inhibiting removal of the ball from the socket.

The resilient restricting portion may comprise an annular resilient protuberance extending in an angular direction toward the socket for permitting insertion of the ball into the socket upon deformation of the resilient protuberance and for inhibiting removal of the ball from the socket. In the alternative, the resilient restricting portion comprises a plurality of resilient protuberances extending in a direction toward the socket for permitting insertion of the ball into the socket upon deformation of the resilient protuberance and for inhibiting removal of the ball from the socket. The plurality of resilient protuberances define a plurality of slots therebetween for enhancing the flexibility and resilience of the resilient restricting portion.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 17A is an enlarged view of a portion of FIG. 17;

FIG. 17B is a view of the retainer of FIG. 17A;

FIG. 20A is an enlarged view of a portion of FIG. 20;

FIG. 20B is a view of the retainer of FIG. 20A;

Similar reference characters refer to similar parts throughout the several Figures of the drawings.

DETAILED DISCUSSION

Figure 1:
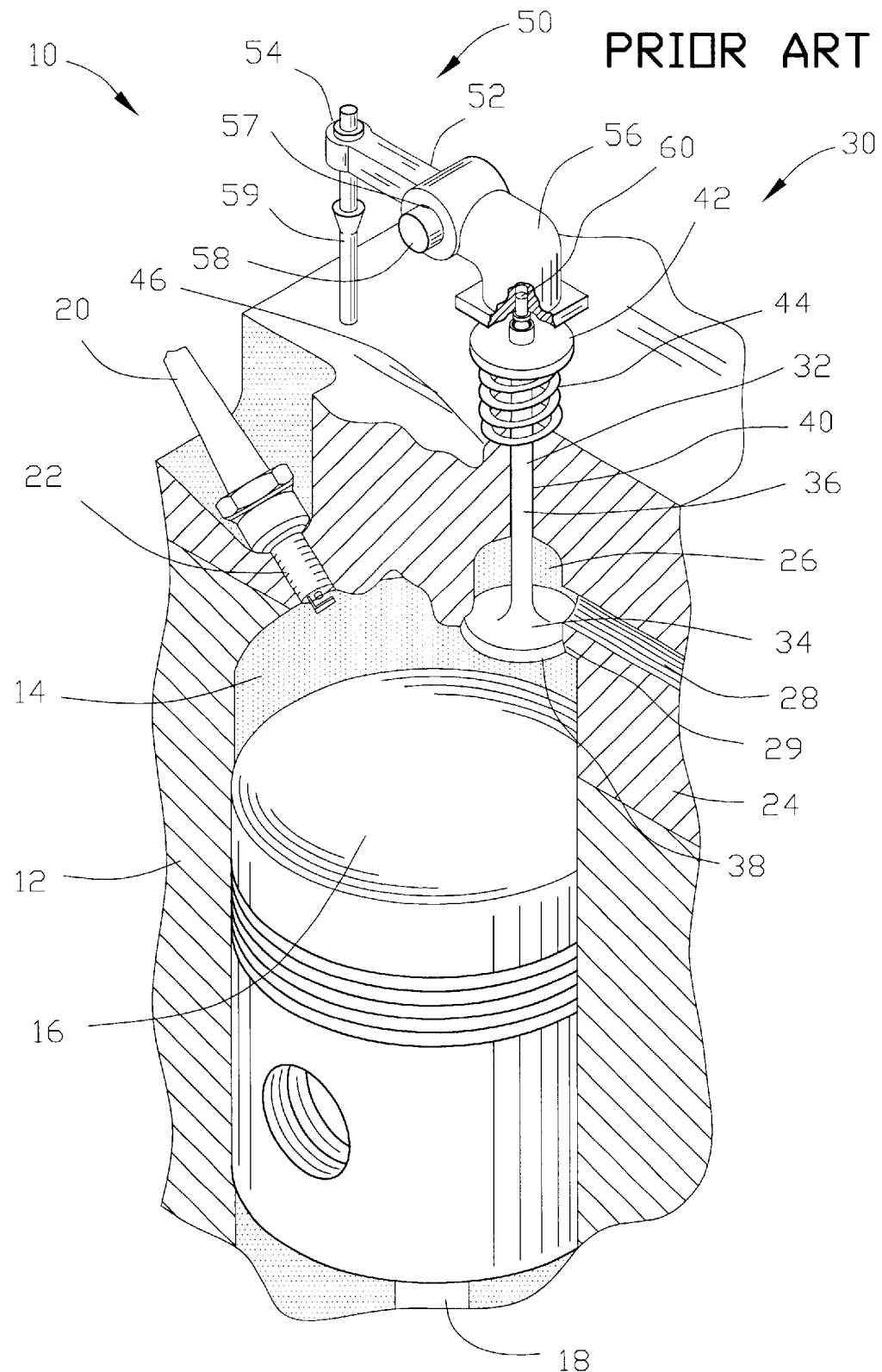
FIG. 1 is an isometric view of a portion of a conventional internal combustion engine illustrating a rocker arm assembly and a valve assembly with a rocker arm coupling interposed therebetween.

FIG. 1 is an isometric view of an internal combustion engine 10 of the type commonly referred to as an overhead valve internal combustion engine. If the internal combustion engine 10 comprises a cylinder block 12 having a cylinder bore 14 receiving a piston 16. The piston 16 is reciprocally mounted within the cylinder bore 14 by a connecting rod 18 as should be well known to those skilled in the art. A spark plug 20 is threadably received within an aperture 22 for providing an ignition to a fuel mixture within the cylinder bore 14. Although the internal combustion engine 10 has been shown as an engine utilizing a spark plug 20 for ignition, it should be understood that the present invention diesel engines not requiring a spark plug for ignition.

The internal combustion engine 10 includes a cylinder head 24 affixed to the cylinder block 12 by conventional means such as bolts as should be well known those skilled in the art. The cylinder head 24 includes a valve aperture 26 communicating with a valve port 28. The valve aperture 26 includes a valve seat 29 defined in the cylinder head 24. The valve port 28 may be representative of either an intake port or an exhaust port of the internal combustion engine 10.

A valve assembly 30 comprises a valve 32 having a valve head 34 and a valve stem 36. The valve head 34 defines a valve face 38 for matingly engaging with the valve seat 29 defined in the cylinder head 24. The valve stem 36 is reciprocally mounted within a valve stem aperture 40 defined within the cylinder head 24. A valve spring keeper 42 is secured to the valve stem 36 for keeping a return spring 44 between the valve spring keeper 44 and an internal surface 46 of the cylinder head 24. The return spring 44 biases the valve face 38 of the valve head 32 into mating engagement with the valve seat 29.

The internal combustion engine 10 includes a rocker arm assembly 50 comprising a rocker arm 52 having a first and a second end 54 and 56. The rocket arm 52 includes a cylindrical orifice 57 interposed between the first in second ends 54 and 56. The cylindrical orifice 57 receives a shaft 58 affixed relative to the cylinder head 24 by means not shown which should be well known to those skilled in the art.

A push rod 59 is actuated by a cam (not shown) to move in a linear reciprocating motion. The push rod 59 engages with the first end 54 of the rocker arm 52 for driving the rocker arm 52 in a reciprocal rocking motion. The second end 56 of the rocker arm 52 drives the valve stem 36 in a linear reciprocating motion against the bias of the return spring 44. When the cam (not shown) is rotated, the linear reciprocating motion of the push rod 59 is translated into a linear reciprocating motion of the valve 32 for moving the valve face 38 into and out of engagement with the valve seat 29 for opening and closing the valve assembly 30.

A rocker arm coupling 60 is interposed between the valve assembly 30 and the rocker arm assembly 50. The rocker arm coupling 60 facilitates the translation of the reciprocal rocking motion of the rocker arm 50 into the reciprocal linear motion of the valve stem 36. Although the rocker arm coupling 60 will be disclosed with a specific type of rocker arm coupling 60, it should be appreciated by those skilled in the art that the present invention is suitable for use with the various types of a rocker arm coupling 60.

Figure 2:
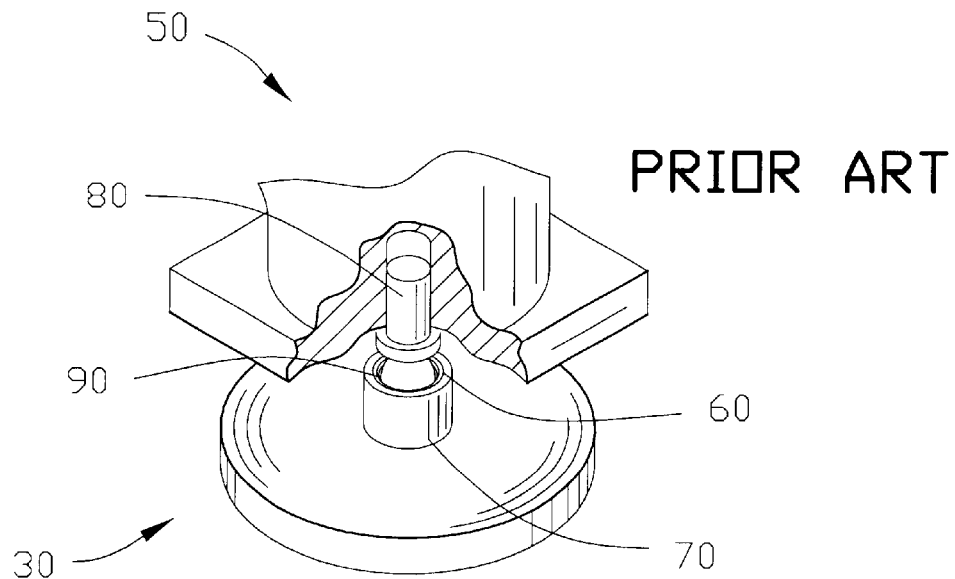
FIG. 2 is an enlarged view of a portion of the rocker arm assembly and a portion of the valve assembly a portion of the rocker arm coupling of FIG. 1.

FIG. 2 is an enlarged view of a portion of the valve assembly 30 and a portion of the rocker arm assembly 50 of FIG. 1 further illustrating the rocker arm coupling 60 of the prior art. The rocker arm coupling 60 comprises a first coupling member 70 engageable relative to the valve assembly 30, a second coupling member 80 engageable relative to the rocker arm assembly 50 and a retainer 90.

Figure 3:
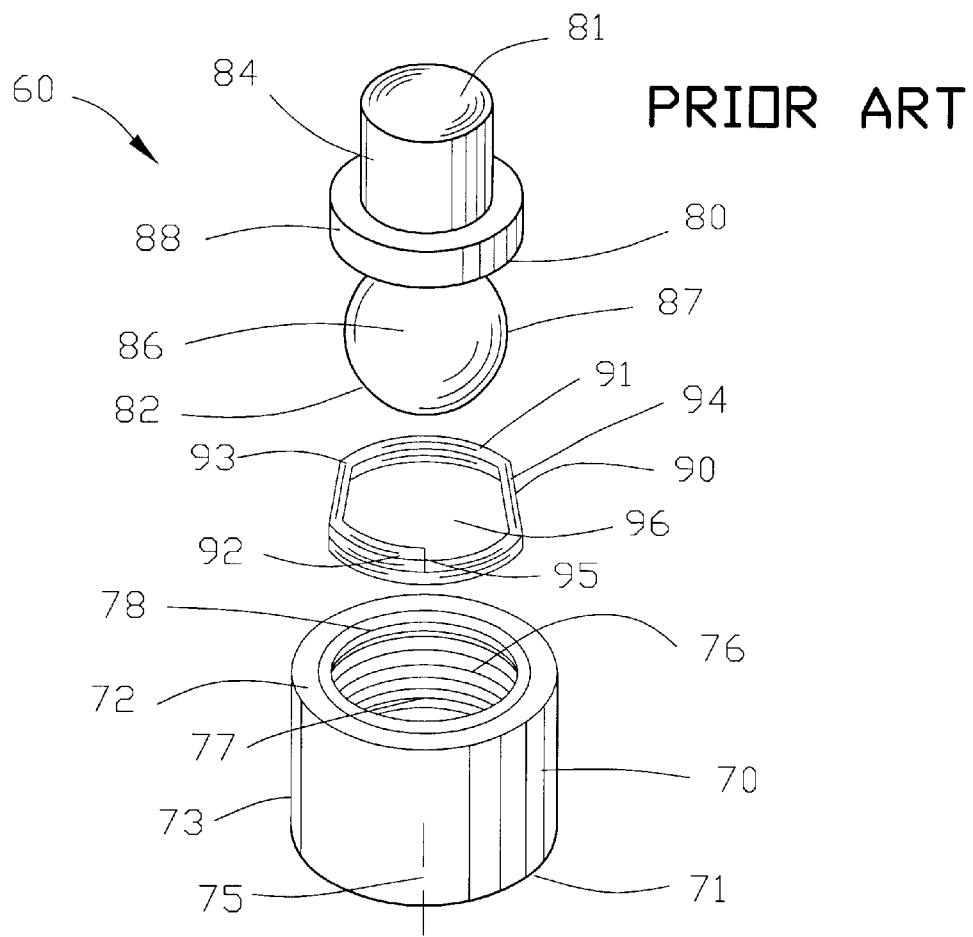
FIG. 3 is an exploded view of the rocker arm coupling of FIG. 2 illustrating a prior art retainer for the rocker arm coupling.
Figure 4:
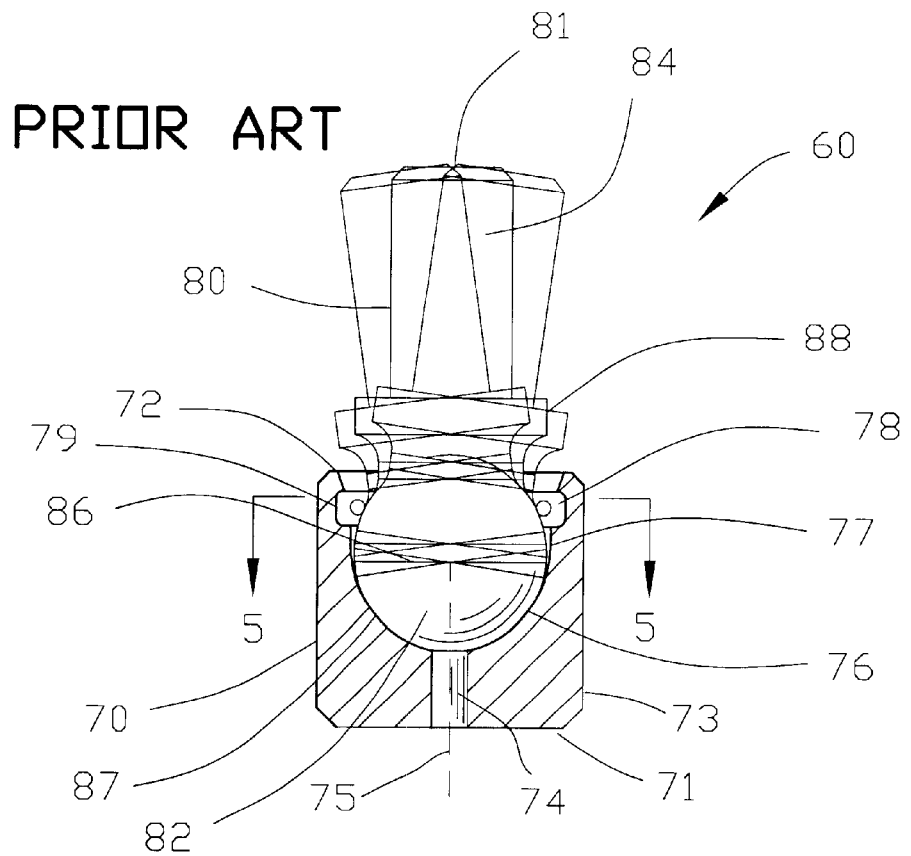
FIG. 4 is a side sectional view of FIG. 3.
Figure 5:
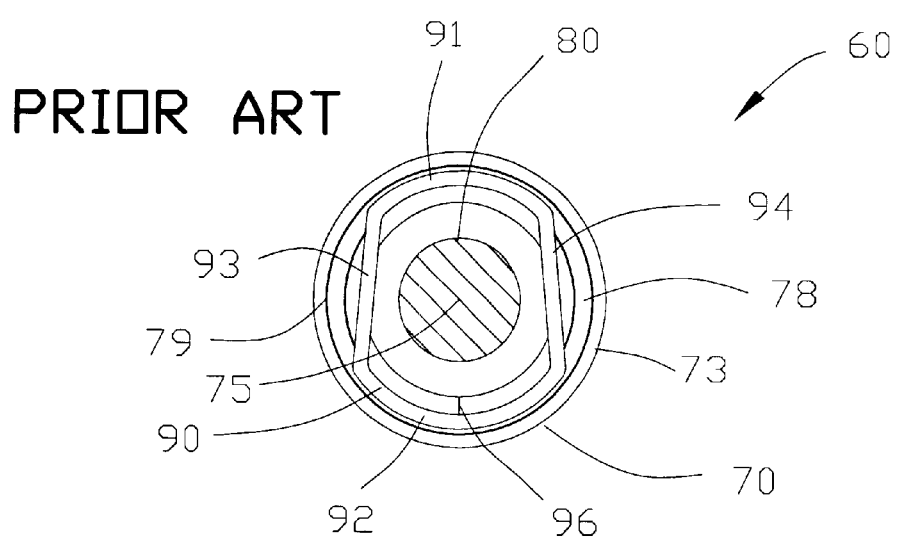
FIG. 5 is a view along line 5—5 in FIG. 4.

FIGS. 3–5 are magnified views of the rocker arm coupling 60 of FIG. 2. The first coupling member 70 is shown as a substantially cylindrical having first cylindrical end 71 and a second cylindrical end 72 and a cylindrical outer surface 73. A lubricating passage 74 extends from the first cylindrical end 71 of the first coupling member 70 along a cylindrical axis 75. A coupling socket 76 extends from the second cylindrical end 72 of the first coupling member 70 and communicates with the lubricating passage 74. The coupling socket 76 defines a coupling socket diameter 77.

As best shown in FIGS. 4 and 5, an annular recess 78 is delineated in the coupling socket 76 of the first coupling member 70. The annular recess 78 defines an annular recess diameter 79. The annular recess diameter 79 is greater than the coupling socket diameter 77. The first coupling member is made from a unitary metallic material such as steel or other type of metallic or alloy material.

The second coupling member 80 extends between a first and a second end 81 and 82. The first end 81 of the second coupling member 80 comprises a shaft 84 whereas the second end 82 of the second coupling member 80 comprises a coupling ball 86. The coupling ball 86 defines a coupling ball diameter 87. An enlarged flange 88 is interposed between the shaft 84 and the coupling ball 86. The second coupling member 80 is a unitary metallic material of such as steel or other out metallic materials were alloy thereof.

The coupling ball 86 of the second coupling member 80 is adapted to be received within the coupling socket 76 of the first coupling member 70. The coupling ball diameter 87 is commensurate with the coupling socket diameter 77 to form a rotational fit.

The prior art retainer 90 comprises a split ring, semi-circular configuration formed by arcuate portions 91 and 92 and linear portions 93 and 94 and a division 95. A central retainer void 96 is defined by the arcuate portions 91 and 92 and linear portions 93 and 94. The prior art retainer 90 is made from a resilient metallic material, such as a coiled spring formed into the split ring, semi-circular configuration shown in FIGS. 3–5.

The arcuate portions 91 and 92 define a partial diameter commensurate with the annular recess diameter 79 of the annular recess 78. The arcuate portions 91 and 92 provide an interference fit with the annular recess 78 of the first coupling member 70. When the prior art retainer 90 is inserted into the annual recess 78 of the first coupling member 70, the arcuate portions 91 and 92 hold the retainer 90 within the annular recess 78.

The linear portions 93 and 94 provide an interference fit with the coupling ball diameter 87 of the coupling ball 86. When the prior art retainer 90 is held within the annual recess 78 of the first coupling member 70, the coupling ball 86 may be inserted into the central retainer void 96 of the prior art retainer 90. The linear portions 93 and 94 temporarily deform to allow the insertion of the coupling ball 86 into the central retainer void 96 of the prior art retainer 90. After the temporary deformation, the linear portions 93 and 94 return to the non-deformed condition and hold the coupling ball 86 within the prior art retainer 90. The prior art retainer 90 inhibits separation of the first coupling member 70 relative to the second coupling member 80.

Although the prior art retainer 90 shown in FIGS. 1–5 functioned satisfactorily during operation, the prior art retainer 90 was difficult to install within the annular recess 78 of the first coupling member 70. In order to insert the arcuate portions 91 and 90 to within the annular recess 78, one of the arcuate portions 91 and 92 had to be inserted into the annular recess 78. Thereafter, the prior art retainer 90 had to be deformed in order to insert the other of the arcuate portions 91 and 92 into the annular recess 78. This insertion process was difficult to be undertaken by automated machine equipment.

Figure 6:
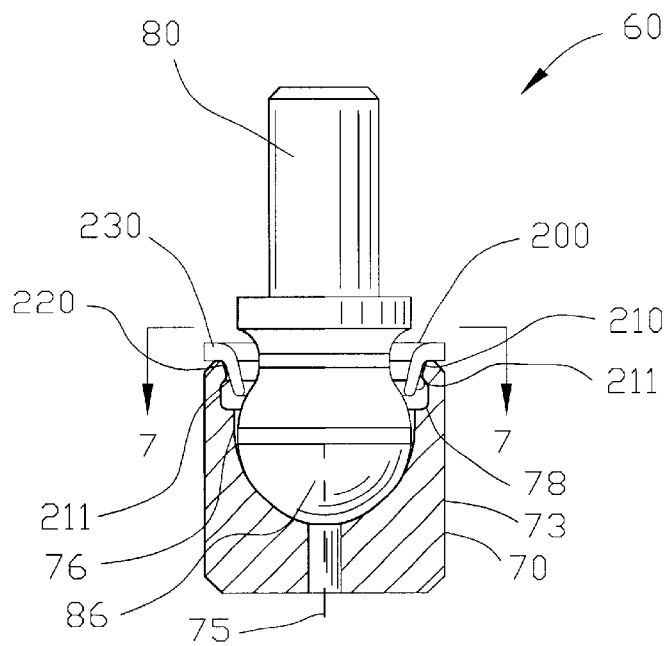
FIG. 6 is a side sectional view similar to FIG. 4 illustrating a first embodiment of a retainer for the rocker arm coupling incorporating the present invention.
Figure 7:
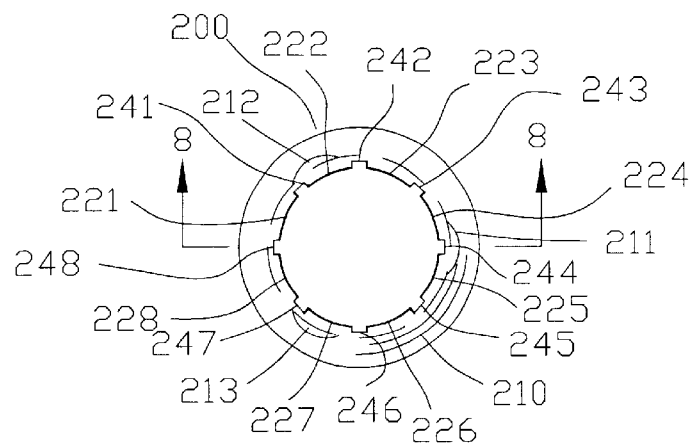
FIG. 7 is a view along line 7—7 in FIG. 6.
Figure 8:
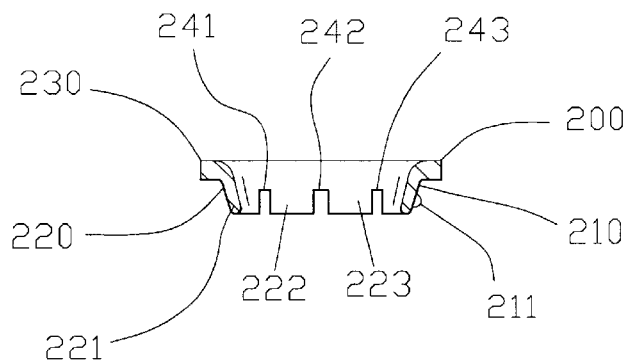
FIG. 8 is a sectional view along line 8—8 in FIG. 7.

FIGS. 6–8 are various views illustrating a first embodiment of the present invention comprising an improved retainer 200 for the rocker arm coupling 60. The improved retainer 200 is formed from a polymeric material for inhibiting separation of the first coupling member 70 relative to the second coupling member 80. Preferably, the improved retainer 200 is formed from a unitary resilient polymeric material such as a high temperature plastic material. For example, the improved retainer 200 may be formed from a high temperature nylon material or any other suitable material.

The improved retainer 200 comprises a mounting portion 210 and a restricting portion 220. The mounting portion 210 secures the improved retainer 200 to the first coupling member 70 whereas the restricting portion 220 permits the insertion of the coupling ball 86 into the coupling socket 76 and thereafter inhibits the removal of the coupling ball 86 from the coupling socket 76.

Preferably, the improved retainer 200 is a resilient retainer consisting of unitary polymeric material comprising an annular body member 230 supporting the resilient mounting portion 210 and the resilient restricting portion 220. The resilient mounting portion 210 of the resilient retainer 200 is engageable with the annular recess 78 delineated within the first coupling member 70 for resiliently securing the resilient retainer 200 to the first coupling member 70.

In this embodiment of the invention, the resilient mounting portion 210 comprises a plurality of projections 211–213 extending from the resilient restricting portion 220 of the resilient retainer 200. The plurality of projections 211–213 are receivable within the annular recess 78 upon deformation of the resilient retainer 200. The plurality of projections 211 resiliently secure the resilient retainer 200 to the first coupling member 70. Preferably, the plurality of projections 211–213 are uniformly distributed about the resilient retainer 200 for centering the resilient retainer 200 relative to the first coupling member 70. Although three projections 211–213 have been shown in this first embodiment of the invention, it should be understood that the present invention is not limited by the number of projections set forth herein.

The resilient restricting portion 220 comprises a resilient protuberance 221 extending toward the coupling socket 76 defined in the first coupling member 70 for permitting insertion of the coupling ball 86 into the coupling socket 76 upon deformation of the resilient protuberance 221. The resilient protuberance 221 is shown as an annular protuberance 221 extending in an angular direction toward the coupling socket 76 for permitting insertion of the coupling ball 86 into the coupling socket 76. The angular direction of the resilient annular protuberance 221 toward the coupling socket 76 inhibits the removal of the coupling ball 86 from the coupling socket 76.

The resilient protuberance 221 may be tapered is a direction toward the coupling socket 76. The tapering of the resilient protuberance 221 enhances the flexibility and resilience of the resilient restricting portion 220. The enhanced flexibility and resilience of the resilient restricting portion 220 facilitates the insertion of the coupling ball 86 into the coupling socket 76.

In this embodiment of the invention, the resilient protuberance 221 comprises a plurality of resilient protuberances 221–228 defining a plurality slots 241–248 therebetween. The plurality of resilient protuberances 221–228 and the plurality slots 241–248 enhance the flexibility and resilience of the resilient restricting portion 220. The enhanced flexibility and resilience of the resilient restricting portion 220 facilitates the insertion of the coupling ball 86 into the coupling socket 76.

Preferably, the plurality of resilient protuberances 221–228 are uniformly distributed about the resilient retainer 200 for coacting uniformly on the coupling ball 86. The uniform distribution of the plurality of resilient protuberances 221–228 uniformly allow the insertion of the coupling ball 86 into the coupling socket 76 and uniformly inhibit the removal of the coupling ball 86 from the coupling socket 76. Although eight resilient protuberances 221–228 have been shown in this first embodiment of the invention, it should be understood that the present invention is not limited by the number of resilient protuberances 221–228 set forth herein.

Figure 9:
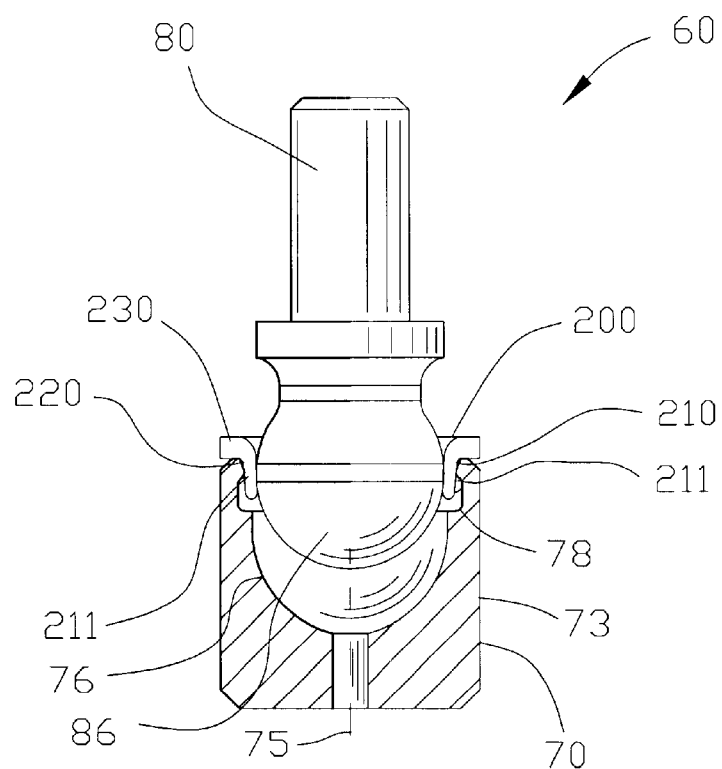
FIG. 9 is a side sectional view similar to FIG. 6 illustrating the initial insertion of a ball of the rocker arm coupling into a socket of the rocker arm coupling.

FIG. 9 is a side sectional view similar to FIG. 6 illustrating the initial insertion of the coupling ball 86 into the coupling socket 76 of the rocker arm coupling 60. The insertion of the coupling ball 86 into the coupling socket 76 deforms the restricting portion 220 by radially expanding or bending the plurality of resilient protuberances 221–228 radially outwardly relative to the cylindrical axis 75 extending through the coupling socket 76. The radial expansion of the plurality of resilient protuberances 221–228 facilitates the insertion of the coupling ball 86 into the coupling socket 76.

Figure 10:
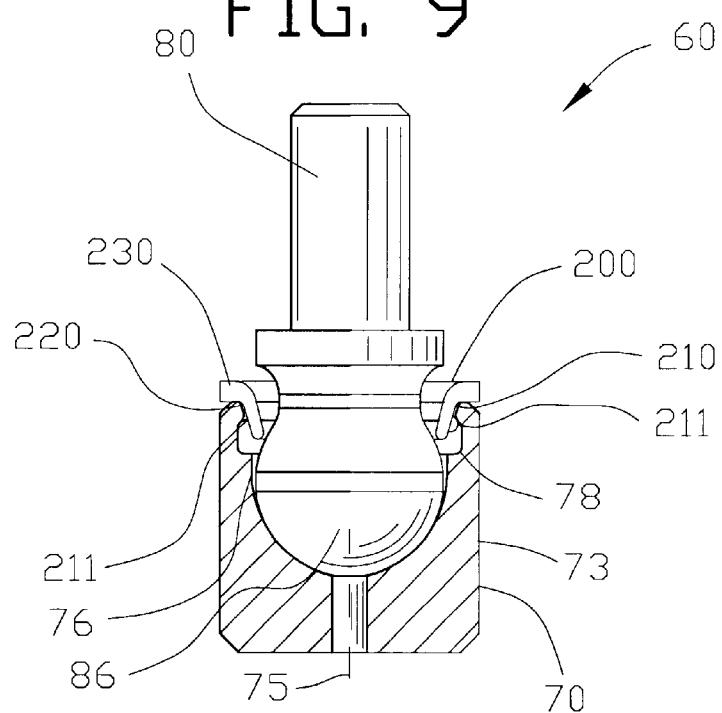
FIG. 10 is a side sectional view similar to FIG. 9 illustrating the complete insertion of the ball of the rocker arm coupling into the socket of the rocker arm coupling.

FIG. 10 is a side sectional view similar to FIG. 9 illustrating the complete insertion of the coupling ball 86 into the coupling socket 76 of the rocker arm coupling 60. After the insertion of the coupling ball 86 into the coupling socket 76, the plurality of resilient protuberances 221–228 return to the non-deformed position shown in FIGS. 6–8 to inhibit the removal of the coupling ball 86 from the coupling socket 76.

Figure 11:
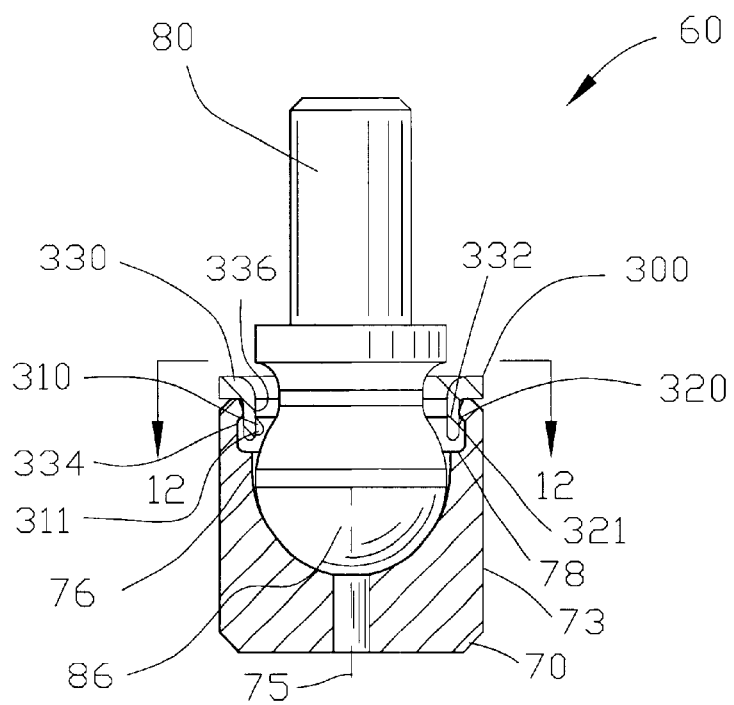
FIG. 11 is a side sectional view similar to FIG. 6 illustrating a second embodiment of a retainer for the rocker arm coupling incorporating the present invention.
Figure 12:
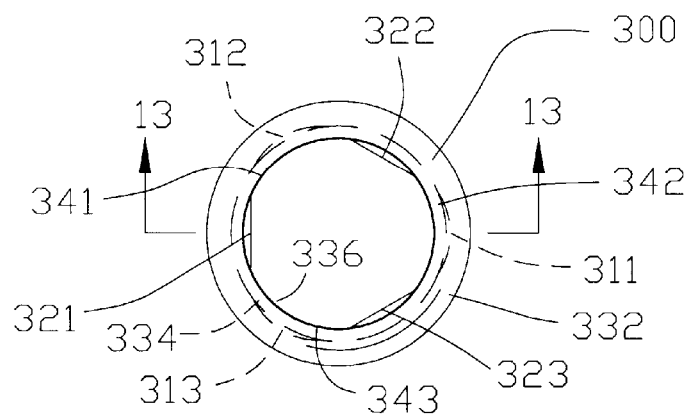
FIG. 12 is a view along line 12—12 in FIG. 11.
Figure 13:
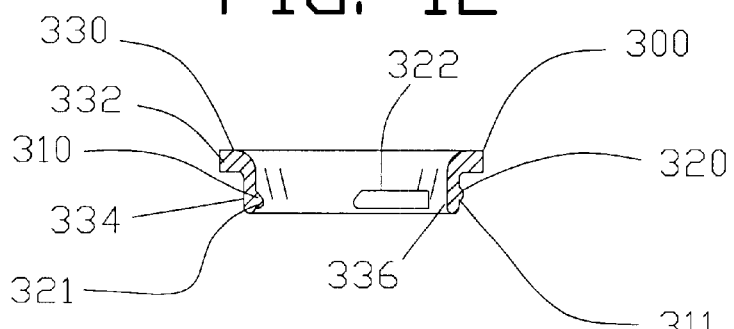
FIG. 13 is a sectional view along line 13—13 in FIG. 12.

FIGS. 11–13 are various views illustrating a second embodiment of the present invention comprising an improved retainer 300 for the rocker arm coupling 60. The improved retainer 300 is formed from a unitary polymeric material for inhibiting separation of the first coupling member 70 relative to the second coupling member 80.

The improved retainer 300 comprises a mounting portion 310 and a restricting portion 320. The mounting portion 310 secures the improved retainer 300 to the first coupling member 70 whereas the restricting portion 320 permits the insertion of the coupling ball 86 into the coupling socket 76 and thereafter inhibits the removal of the coupling ball 86 from the coupling socket 76.

The improved retainer 300 is a resilient retainer consisting of unitary polymeric material comprising an annular body member 330 supporting a resilient sleeve 332 for mounting the resilient mounting portion 310 and the resilient restricting portion 320. The annular body member 330 is disposed external to the coupling socket 76 of the first coupling member 70 whereas the sleeve 332 is disposed within the coupling socket 76 of the first coupling member 70. The sleeve 332 defines an external surface 334 and an internal surface 336.

In this embodiment of the invention, the resilient mounting portion 310 comprises a plurality of projections 311–313 extending from the external surface 334 of the sleeve 332. The plurality of projections 311–313 are receivable within the annular recess 78 upon deformation of the sleeve 332. The plurality of projection 311–313 are engageable with the annular recess 78 delineated within the first coupling member 70 for resiliently securing the resilient retainer 300 to the first coupling member 70. Preferably, the plurality of projections 311–313 are uniformly distributed about the resilient retainer 300 for centering the resilient 300 relative to the first coupling member 70. Although three projections 311–313 have been shown in this second embodiment of the invention, it should be understood that the present invention is not limited by the number of projections set forth herein The resilient restricting portion 320 comprises a resilient protuberance 321 extending from the internal surface 336 of the sleeve 332 toward the coupling socket 76 defined in the first coupling member 70. In this embodiment of the invention, the resilient protuberance 321 comprises a plurality of resilient protuberances 321–323 defining a plurality of spaces 341–343 therebetween. The plurality of resilient protuberances 321–323 and the plurality of spaces 341–343 facilitate the insertion of the coupling ball 86 into the coupling socket 76.

Preferably, the plurality of resilient protuberances 321–323 are uniformly distributed about the internal surface 336 of the sleeve 332 for coacting uniformly on the coupling ball 86. The uniform distribution of the plurality of resilient protuberances 321–323 uniformly allow the insertion of the coupling ball 86 into the coupling socket 76 and uniformly inhibit the removal of the coupling ball 86 from the coupling socket 76. Although three resilient protuberances 321–323 have been shown in this second embodiment of the invention, it should be understood that the present invention is not limited by the number of resilient protuberances 321–323 set forth herein.

Preferably, the plurality of projections 311–313 are uniformly distributed about the resilient retainer 300 for centering the resilient retainer 300 relative to the first coupling member 70. Although three projections 311–313 have been shown in this second embodiment of the invention, it should be understood that the present invention is not limited by the number of projections set forth herein.

The resilient restricting portion 320 comprises a resilient protuberance 321 extending from the internal surface 336 of the sleeve 332 toward the coupling socket 76 defined in the first coupling member 70. In this embodiment of the invention, the resilient protuberance 321 comprises a plurality of resilient protuberances 321–323 defining a plurality of spaces 341–343 therebetween. The plurality of resilient protuberances 321–323 and the plurality of spaces 341–343 facilitate the insertion of the coupling ball 86 into the coupling socket 76.

Preferably, the plurality of resilient protuberances 321–323 are uniformly distributed about the internal surface 336 of the sleeve 332 for coacting uniformly on the coupling ball 86. The uniform distribution of the plurality of resilient protuberances 321–323 uniformly allow the insertion of the coupling ball 86 into the coupling socket 76 and uniformly inhibit the removal of the coupling ball 86 from the coupling socket 76. Although three resilient protuberances 321–323 have been shown in this second embodiment of the invention, it should be understood that the present invention is not limited by the number of resilient protuberances 321–323 set forth herein.

Preferably, the plurality of projections 311–313 disposed on the external surface 334 of the sleeve 332 are not aligned with the plurality of resilient protuberances 321–323 distributed about the internal surface 336 of the sleeve 332. The alignment of the plurality of resilient protuberances 321–323 with the plurality of resilient protuberances 321–323 adds mechanical strength to the plurality of resilient protuberances 321–323.

The insertion of the coupling ball 86 into the coupling socket 76 deforms the restricting portion 320 by radially expanding the plurality of resilient protuberances 321–323 and/or the sleeve 332 radially outwardly relative to the cylindrical axis 75 extending through the coupling socket 76. The radial expansion of the plurality of resilient protuberances 321–323 and/or the sleeve 332 facilitates the insertion of the coupling ball 86 into the coupling socket 76.

After the insertion of the coupling ball 86 into the coupling socket 76, the plurality of resilient protuberances 321–323 and/or the sleeve 332 return to a non-deformed position to inhibit the removal of the coupling ball 86 from the coupling socket 76.

Figure 14:
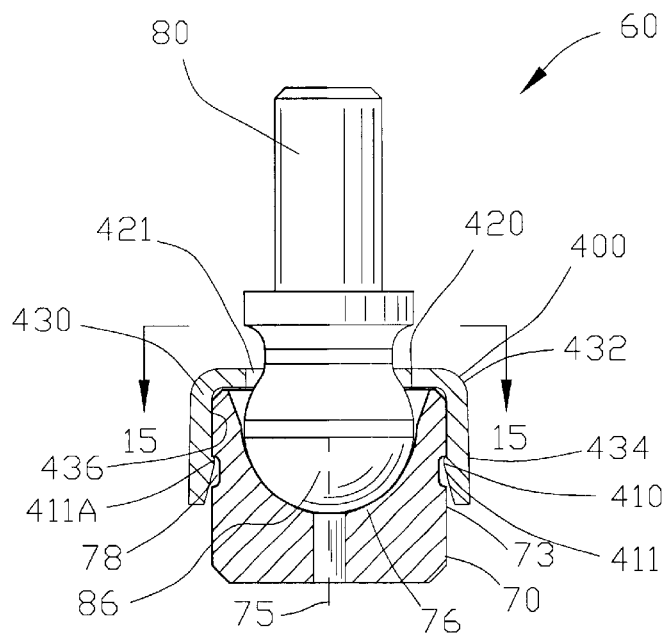
FIG. 14 is a side sectional view similar to FIG. 6 illustrating a third embodiment of a retainer for the rocker arm coupling incorporating the present invention.
Figure 15:
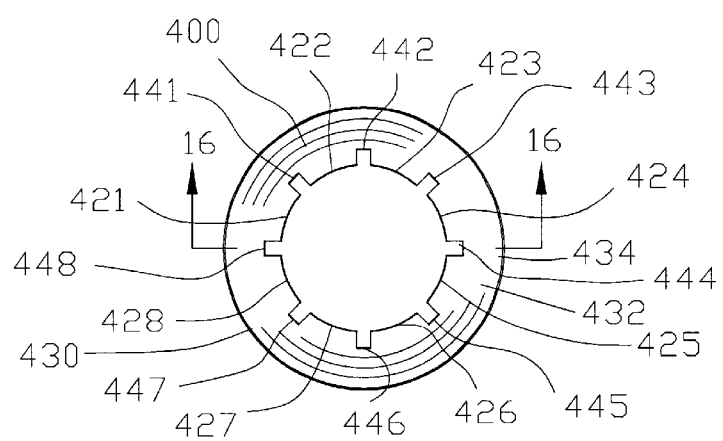
FIG. 15 is a view along line 15—15 in FIG. 14.
Figure 16:
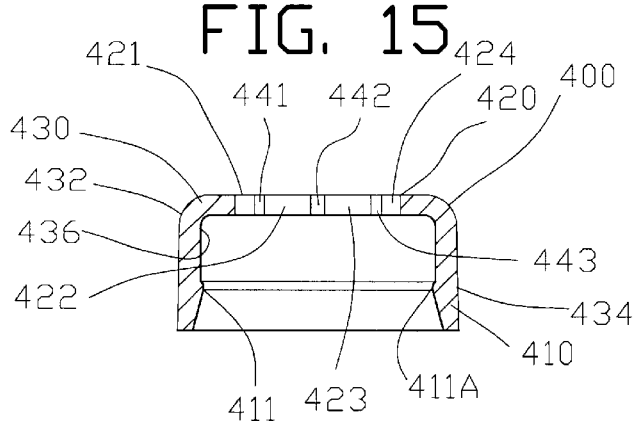
FIG. 16 is a sectional view along line 16—16 in FIG. 14.

FIGS. 14–16 are various views illustrating a third embodiment of the present invention comprising an improved retainer 400 for the rocker arm coupling 60. The improved retainer 400 is formed from a unitary polymeric material for inhibiting separation of the first coupling member 70 relative to the second coupling member 80. In this embodiment of the invention, the annular recess 78 is located on the outer cylindrical surface 73 of the first coupling member 70.

The improved retainer 400 comprises a mounting portion 410 and a restricting portion 420. The mounting portion 410 secures the improved retainer 400 to the first coupling member 70 whereas the restricting portion 420 permits the insertion of the coupling ball 86 into the coupling socket 76 and thereafter inhibits the removal of the coupling ball 86 from the coupling socket 76.

The improved retainer 400 is a resilient retainer consisting of unitary polymeric material comprising an annular body member 430 supporting a resilient sleeve 432 for mounting the resilient mounting portion 410. The annular body member 430 and the sleeve 432 are disposed external to the coupling socket 76 of the first coupling member 70. The sleeve 432 defines an external surface 434 and an internal surface 436. The resilient sleeve 432 may be provided with slots for enhancing the outward radial expansion of the resilient sleeve 432.

In this embodiment of the invention, the resilient mounting portion 410 comprises an annular projection 411 extending from the internal surface 436 of the sleeve 432. The projection 411 is receivable within the annular recess 78 located on the outer cylindrical surface 73 of the first coupling member 70. The projection 411 is receivable within the annular recess 78 upon the deformation of the sleeve 432. The projection 411 is engageable with the annular recess 78 delineated within the first coupling member 70 for resiliently securing the resilient retainer 400 to the first coupling member 70.

Preferably, the projections 411 is an annular projection extending about the resilient retainer 400 for centering the resilient retainer 400 relative to the first coupling member 70. In the alternative, the projections 411 may be a plurality of projections uniformly distributed about the resilient retainer 400.

The resilient restricting portion 420 comprises a protuberance 421 extending from the annular body member 430 toward the coupling socket 76 defined in the first coupling member 70. In this embodiment of the invention, the protuberance 421 comprises a plurality of protuberances 421–428 defining a plurality of spaces 441–448 therebetween. The plurality of resilient protuberances 421–428 and the plurality of spaces 441–448 facilitate the insertion of the coupling ball 86 into the coupling socket 76.

Preferably, the plurality of protuberances 421–428 are uniformly distributed about the annular body member 430 for coacting uniformly on the coupling ball 86. The uniform distribution of the plurality of resilient protuberances 421–428 uniformly allow the insertion of the coupling ball 86 into the coupling socket 76 and uniformly inhibit the removal of the coupling ball 86 from the coupling socket 76. Although eight resilient protuberances 421–428 have been shown in this third embodiment of the invention, it should be understood that the present invention is not limited by the number of resilient protuberances 421–428 set forth herein.

The insertion of the coupling ball 86 into the coupling socket 76 deforms the restricting portion 420 by radially expanding the plurality of resilient protuberances 421–428 and/or the annular body member 430 radially outwardly relative to the cylindrical axis 75 extending through the coupling socket 76. The radial expansion of the plurality of resilient protuberances 421–428 and/or the annular body member 430 facilitates the insertion of the coupling ball 86 into the coupling socket 76.

After the insertion of the coupling ball 86 into the coupling socket 76, the plurality of resilient protuberances 421–428 and/or the annular body member 430 return to a non-deformed position to inhibit the removal of the coupling ball 86 from the coupling socket 76.

Figure 17:
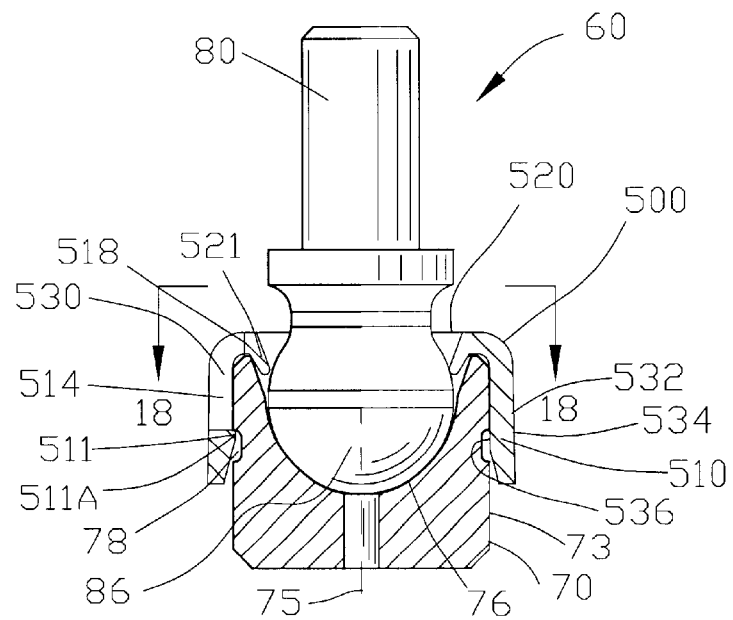
FIG. 17 is a side sectional view similar to FIG. 6 illustrating a fourth embodiment of a retainer for the rocker arm coupling incorporating the present invention.
Figure 18:
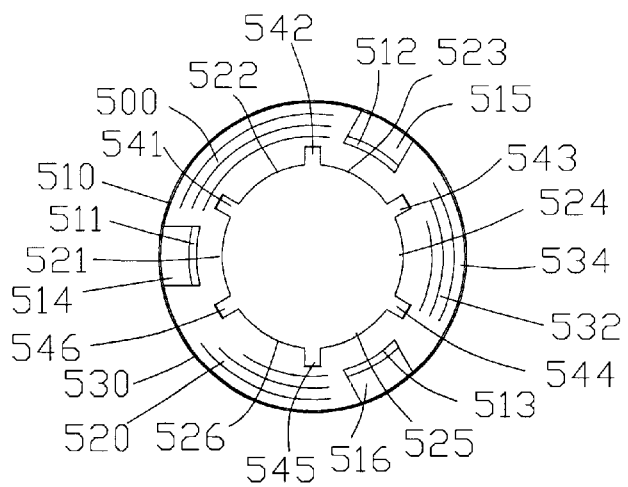
FIG. 18 is a view along line 18—18 in FIG. 17.
Figure 19:
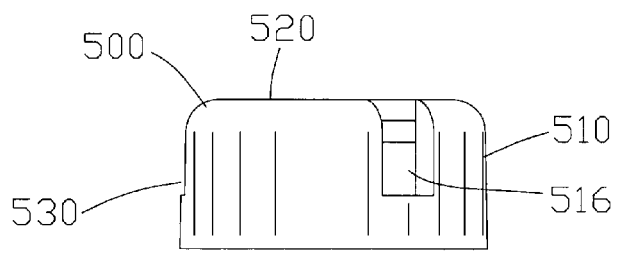
FIG. 19 is a side view of FIG. 18.

FIGS. 17–19 are various views illustrating a fourth embodiment of the present invention comprising an improved retainer 500 for the rocker arm coupling 60. The improved retainer 500 is formed from a unitary polymeric material for inhibiting separation of the first coupling member 70 relative to the second coupling member 80. An annular recess 78 is located on the outer cylindrical surface 73 of the first coupling member 70.

The improved retainer 500 comprises a mounting portion 510 and a restricting portion 520. The mounting portion 510 secures the improved retainer 500 to the first coupling member 70 whereas the restricting portion 520 permits the insertion of the coupling ball 86 into the coupling socket 76 and thereafter inhibits the removal of the coupling ball 86 from the coupling socket 76.

The improved retainer 500 is a resilient retainer consisting of unitary polymeric material comprising an annular body member 530 supporting a resilient sleeve 532 for mounting the resilient mounting portion 510. The annular body member 530 and the sleeve 532 are disposed external to the coupling socket 76 of the first coupling member 70. The resilient sleeve 532 defines an external surface 534 and an internal surface 536.

In this embodiment of the invention, the resilient mounting portion 510 includes a plurality of projections 511–513 uniformly distributed about the resilient retainer 500. The projections 511–513 are receivable within the annular recess 78 located on the outer cylindrical surface 73 of the first coupling member 70 for resiliently securing the resilient retainer 500 to the first coupling member 70. The projections 511–513 are receivable within the annular recess 78 upon the deformation of the sleeve 532.

In this embodiment of the invention, a plurality of voids 514–516 are defined within the sleeve 532. Each of the plurality of voids 514–516 extends through the sleeve 532. The plurality of voids 514–516 are located adjacent to the plurality of projections 511–513. The function of the plurality of voids 514–516 will be described in greater detail with reference to FIG. 17A.

The resilient restricting portion 520 comprises a protuberance 521 extending from the annular body member 530 toward the coupling socket 76 defined in the first coupling member 70. In this embodiment of the invention, the protuberance 521 comprises a plurality of protuberances 521–526 defining a plurality of spaces 541–546 therebetween. The plurality of resilient protuberances 521–526 and the plurality of spaces 541–546 facilitate the insertion of the coupling ball 86 into the coupling socket 76.

Preferably, the plurality of protuberances 521–526 are uniformly distributed about the annular body member 530 for coacting uniformly on the coupling ball 86. Furthermore, the plurality of protuberances 521–526 are established with protuberances 521, 523 and 525 being adjacent to the voids 514, 515 and 516, respectively. This distribution of the plurality of resilient protuberances 521–526 allows the insertion of the coupling ball 86 into the coupling socket 76 and uniformly inhibit the removal of the coupling ball 86 from the coupling socket 76. Although six resilient protuberances 521–526 have been shown in this third embodiment of the invention, it should be understood that the present invention is not limited by the number of resilient protuberances 521–526 set forth herein.

The insertion of the coupling ball 86 into the coupling socket 76 deforms the restricting portion 520 by radially expanding the plurality of resilient protuberances 521–526 and/or the annular body member 530 radially outwardly relative to the cylindrical axis 75 extending through the coupling socket 76. The radial expansion of the plurality of resilient protuberances 521–526 and/or the annular body member 530 facilitates the insertion of the coupling ball 86 into the coupling socket 76.

After the insertion of the coupling ball 86 into the coupling socket 76, the plurality of resilient protuberances 521–526 and/or the annular body member 530 return to a non-deformed position to inhibit the removal of the coupling ball 86 from the coupling socket 76.

Figure 20:
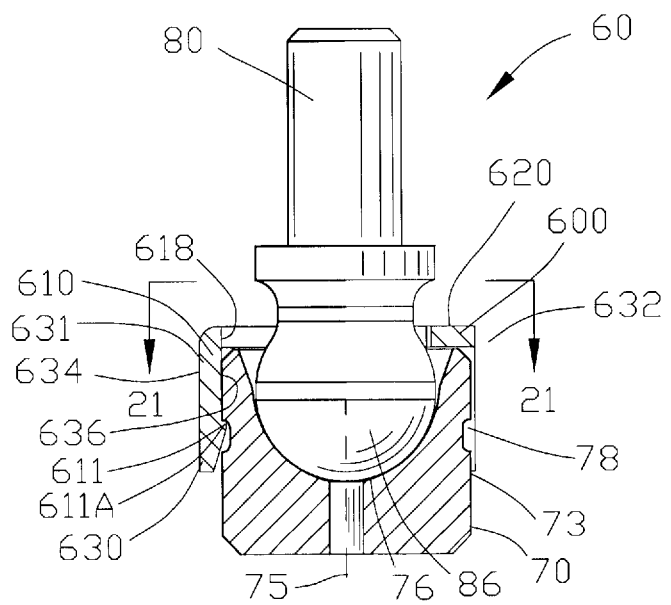
FIG. 20 is a side sectional view similar to FIG. 6 illustrating a fifth embodiment of a retainer for the rocker arm coupling incorporating the present invention.
Figure 21:
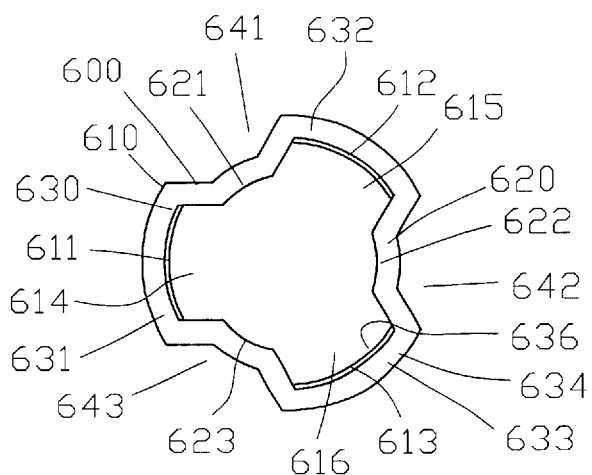
FIG. 21 is a view along line 21—21 in FIG. 20.
Figure 22:
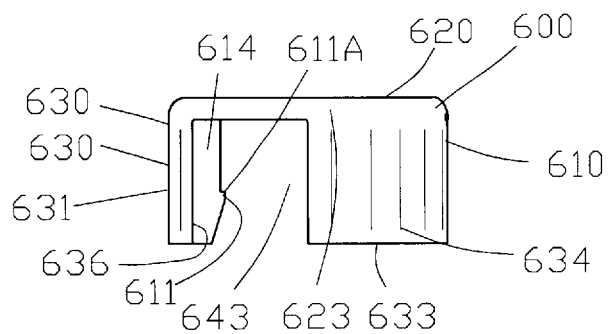
FIG. 22 is a side view of FIG. 21.

FIGS. 20–22 are various views illustrating a fifth embodiment of the present invention comprising an improved retainer 600 for the rocker arm coupling 60. The improved retainer 600 is formed from a unitary polymeric material for inhibiting separation of the first coupling member 70 relative to the second coupling member 80. An annular recess 78 is located on the outer cylindrical surface 73 of the first coupling member 70.

The improved retainer 600 comprises a mounting portion 610 and a restricting portion 620. The mounting portion 610 secures the improved retainer 600 to the first coupling member 70 whereas the restricting portion 620 permits the insertion of the coupling ball 86 into the coupling socket 76 and thereafter inhibits the removal of the coupling ball 86 from the coupling socket 76.

The improved retainer 600 is a resilient retainer consisting of unitary polymeric material comprising a partially annular body member 630 having a plurality of legs 631–633 for mounting the resilient mounting portion 610. The plurality of legs 631–633 are disposed external to the coupling socket 76 of the first coupling member 70. Each of the plurality of legs 631–633 defines an external surface 634 and an internal surface 636. The plurality of legs 631–633 are separated by a plurality of slots 641–643 for enhancing the outward radial expansion of the plurality of legs 631–633.

A plurality of projections 611–613 extend from the internal surfaces 636 of each of the plurality of legs 631–633. The plurality of projection 611–613 are receivable within the annular recess 78 located on the outer cylindrical surface 73 of the first coupling member 70. The plurality of projections 611–613 are receivable within the annular recess 78 upon the deformation of each of the plurality of legs 631–633. The plurality of projections 611–613 resiliently secure the resilient retainer 600 to the first coupling member 70.

In this embodiment of the invention, a plurality of voids 614–616 are defined within the improved retainer 600. Each of the plurality of voids 614–616 extends through the improved retainer 600. The plurality of voids 514–516 are located adjacent to the plurality of projections 611–613. The function of the plurality of voids 514–516 will be described in greater detail hereinafter with reference to FIG. 20A.

The resilient restricting portion 620 comprises a plurality of protuberances 621–623 extending from the annular body member 630 toward the coupling socket 76 defined in the first coupling member 70. The plurality of protuberances 621–623 are interposed between the plurality of slots 641–643. The plurality of resilient protuberances 621–623 and the plurality of slots 641–643 facilitate the insertion of the coupling ball 86 into the coupling socket 76.

The plurality of protuberances 621–623 are uniformly distributed about the annular body member 630 for coacting uniformly on the coupling ball 86. The uniform distribution of the plurality of resilient protuberances 621–623 uniformly allow the insertion of the coupling ball 86 into the coupling socket 76 and uniformly inhibit the removal of the coupling ball 86 from the coupling socket 76. Although three resilient protuberances 621–623 have been shown in this fifth embodiment of the invention, it should be understood that the present invention is not limited by the number of resilient protuberances 621–623 set forth herein.

The insertion of the coupling ball 86 into the coupling socket 76 deforms the restricting portion 620 by radially expanding the plurality of resilient protuberances 621–623 and/or the annular body member 630 radially outwardly relative to the cylindrical axis 75 extending through the coupling socket 76. The radial expansion of the plurality of resilient protuberances 621–623 and the plurality of slots 641–643 facilitates the insertion of the coupling ball 86 into the coupling socket 76.

After the insertion of the coupling ball 86 into the coupling socket 76, the plurality of resilient protuberances 621–623 return to a non-deformed position to inhibit the removal of the coupling ball 86 from the coupling socket 76.

Referring back to FIG. 14, the projection 411 engages with the annular recess 78 of the first coupling member 70 for resiliently securing the resilient retainer 500 to the first coupling member 70. The projection 411 is shown having a rounded apex 411A. The rounded apex 411A of the projection 411 enables the resilient retainer 500 to be removed from the first coupling member 70 with damage to the projection 411.

FIG. 17A is an enlarged view of a portion of FIG. 17 illustrating the engagement of the projection 511 with the annular recess 78 of the first coupling member 70 for resiliently securing the resilient retainer 500 to the first coupling member 70. The projection 511 is shown having a pointed apex 511A. The pointed apex 511A of the projection 511 enhances the engagement with the annular recess 78 of the first coupling member 70 and prevents removal of the resilient retainer 500 from the first coupling member 70. In some cases, the pointed apex 511A of the projection 511 must be damaged in order to remove the resilient retainer 500 from the first coupling member 70.

FIG. 17B is a view of the resilient retainer 500 of FIG. 17A. In this example, the void 514 extends from the external surface 534 inwardly toward the axis of symmetry 75. The external surface 534 extends inwardly beyond the internal surface 536 and terminates in a terminating surface 518. The terminating surface 518 is positioned inwardly of the pointed apex 511A of the projection 511. The position of terminating surface 518 of the void 514 being located inwardly from the pointed apex 511A has certain advantages when the resilient retainer 500 is formed in a molding process.

For example, the void 514 in the resilient retainer 500 may be formed by a rib (not shown) extending from a mold cavity (not shown). The rib cooperates with other core parts (not shown) of the mold assembly to form the pointed apex 511A of the projection 511. Upon the opening of the mold assembly, the resilient retainer 500 may be extracted from the mold assembly without damage to the pointed apex 511A of the projection 511. The position of void 514 enables the projection 511 to be molded with the pointed apex 511A as shown in FIGS. 17A and 17B.

FIG. 20A is an enlarged view of a portion of FIG. 20 illustrating the engagement of the projection 611 with the annular recess 78 of the first coupling member 70 for resiliently securing the resilient retainer 600 to the first coupling member 70. In a manner similar to FIG. 17A, the projection 611 is shown having a pointed apex 611A. The pointed apex 611A of the projection 611 prevents removal of the resilient retainer 600 from the first coupling member 70.

FIG. 20B is a view of the resilient retainer 600 of FIG. 20A. In this example, the void 614 extends outwardly from the axis of symmetry 75. The void 614 extends outwardly from the axis of symmetry 75 to the internal surface 636 and terminates in a terminating surface 618. The terminating surface 618 is positioned outward of the pointed apex 611A of the projection 611. The position of the void 614 enables the projection 611 to be molded with the pointed apex 611A as shown in FIGS. 20A and 20B.

The forgoing has described five embodiments of the mounting portion and the restricting portion incorporating the present invention. However, it should be understood that numerous variations of the five embodiments may be provided under the present invention.

The improved retainer for the rocker arm coupling provides a significant advancement to overcome the difficulties of the prior art. The improved retainer facilitates the insertion of the ball within the socket of the rocker arm coupling without the use of specialized tools required by the prior art. The improved retainer is made of a resilient polymeric material that is economical to manufacture and install for use with conventional rocker arm couplings of the prior art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In an internal combustion engine having a valve assembly and a rocker arm assembly with a rocker arm coupling interposed therebetween, the rocker arm coupling comprising a first coupling member engageable relative to the valve assembly and a second coupling member engageable relative to the rocker arm assembly, the first coupling member having a socket for receiving a ball extending from the second coupling member and with an annular recess delineated within the first coupling member:

the improvement comprising:

a resilient retainer comprising a resilient mounting portion and a resilient restricting portion;

said resilient mounting portion of said resilient retainer having a plurality of projections being engageable with the recess delineated within the first coupling member for resiliently securing said resilient retainer to the first coupling member;

a plurality of voids defined in said resilient mounting portion and located adjacent to said plurality of projections, respectively; and said resilient restricting portion permitting insertion of the ball into the socket defined in the first coupling member upon deformation of said resilient restricting portion with said resilient restricting portion inhibiting removal of the ball from the socket.

2. An improvement as set forth in claim 1, wherein said resilient retainer is a unitary polymeric material.

3. An improvement as set forth in claim 1, wherein said resilient retainer is a unitary high temperature plastic material.

4. An improvement as set forth in claim 1, wherein said plurality of projections are receivable within the recess delineated within the first coupling member upon deformation of said resilient retainer for resiliently securing said resilient retainer to the first coupling member.

5. An improvement as set forth in claim 1, wherein said plurality of voids are located in radial adjacent alignment with said plurality of projections, respectively.

6. An improvement as set forth in claim 1, wherein said plurality of voids extend radially inwardly from an external surface of said resilient retainer past said plurality of projections, respectively.

7. An improvement as set forth in claim 1, wherein said plurality of voids extend radially outwardly from an axis of symmetry of said resilient retainer past said plurality of projections, respectively.

8. An improvement as set forth in claim 1, wherein said resilient restricting portion comprises a resilient protuberance extending toward the socket for permitting insertion of the ball into the socket upon deformation of said resilient protuberance and for inhibiting removal of the ball from the socket.

9. An improvement as set forth in claim 1, wherein said resilient restricting portion comprises a resilient protuberance extending toward the socket;

said resilient protuberance being tapered for permitting insertion of the ball into the socket upon deformation of said resilient protuberance and for inhibiting removal of the ball from the socket.

10. An improvement as set forth in claim 1, wherein said resilient restricting portion comprises a resilient protuberance extending in an angular direction toward the socket for permitting insertion of the ball into the socket upon deformation of said resilient protuberance and for inhibiting removal of the ball from the socket.

11. An improvement as set forth in claim 1, wherein said resilient restricting portion comprises an annular resilient protuberance extending in an angular direction toward the socket for permitting insertion of the ball into the socket upon deformation of said resilient protuberance and for inhibiting removal of the ball from the socket.

12. An improvement as set forth in claim 1, wherein said resilient restricting portion comprises a plurality of resilient protuberances extending in a direction toward the socket for permitting insertion of the ball into the socket upon deformation of said resilient protuberance and for inhibiting removal of the ball from the socket.

13. In an internal combustion engine having a valve assembly and a rocker arm assembly with a rocker arm coupling interposed therebetween, the rocker arm coupling comprising a first coupling member engageable relative to the valve assembly and a second coupling member engageable relative to the rocker arm assembly, the first coupling member having a socket for receiving a ball extending from the second coupling member and with an annular recess delineated within the first coupling member:

the improvement comprising:

a resilient retainer consisting of unitary polymeric material comprising an annular body member supporting a resilient mounting portion and a resilient restricting portion;

said resilient mounting portion comprising a plurality of projections extending from said resilient retainer with said plurality of projections being receivable within the recess delineated within the first coupling member upon deformation of said resilient retainer for resiliently securing said resilient retainer to the first coupling member;

a plurality of voids defined in said resilient mounting portion and located adjacent to said plurality of projections, respectively; and said resilient restricting portion comprises a resilient protuberance extending toward the socket defined in the first coupling member for permitting insertion of the ball into the socket upon deformation of said resilient protuberance and for inhibiting removal of the ball from the socket.

14. An improvement as set forth in claim 13, wherein said plurality of voids are located in radial adjacent alignment with said plurality of projections, respectively.

15. An improvement as set forth in claim 13, wherein said plurality of voids extend radially inwardly from an external surface of said resilient retainer past said plurality of projections, respectively.

16. An improvement as set forth in claim 13, wherein said plurality of voids extend radially outwardly from an axis of symmetry of said resilient retainer past said plurality of projections, respectively.

17. An improvement as set forth in claim 13, wherein said resilient restricting portion comprises a resilient protuberance extending toward the socket for permitting insertion of the ball into the socket upon deformation of said resilient protuberance and for inhibiting removal of the ball from the socket.

18. An improvement as set forth in claim 13, wherein said resilient protuberance is tapered for permitting insertion of the ball into the socket upon deformation of said resilient protuberance and for inhibiting removal of the ball from the socket.

19. An improvement as set forth in claim 13, wherein said resilient protuberance extends in an angular direction toward the socket for permitting insertion of the ball into the socket upon deformation of said resilient protuberance and for inhibiting removal of the ball from the socket.

20. An improvement as set forth in claim 13, wherein said resilient protuberance comprises a plurality of resilient protuberances extending in a direction toward the socket for permitting insertion of the ball into the socket upon deformation of said resilient protuberance and for inhibiting removal of the ball from the socket.

* * * * *